United States Patent
Hebeler et al.

(10) Patent No.: US 6,304,756 B1
(45) Date of Patent: Oct. 16, 2001

(54) CHANNEL ARBITRATION BETWEEN HANDSET AND BASE STATION IN A CORDLESS TELEPHONE SYSTEM

(75) Inventors: Steven E. Hebeler; Ken Alton, both of Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/186,319

(22) Filed: Nov. 4, 1998

(51) Int. Cl.$^7$ ................................................ H64Q 7/20
(52) U.S. Cl. ............................ 455/450; 455/62; 455/434
(58) Field of Search .................................. 455/32.1, 450, 455/452, 455, 166.1, 67.1, 451, 62, 63, 464, 426

(56) References Cited

U.S. PATENT DOCUMENTS

| | | |
|---|---|---|
| 4,365,347 | 12/1982 | Otsuka et al. ................... 455/179 |
| 4,768,219 | 8/1988 | Yamagata et al. ................ 379/61 |
| 4,894,856 * | 1/1990 | Nakanishi et al. .............. 455/32.1 |
| 4,989,230 | 1/1991 | Gillig et al. ..................... 379/59 |
| 5,044,010 | 8/1991 | Frenkiel et al. ................. 379/61 |
| 5,073,932 | 12/1991 | Yossifor et al. ................. 380/23 |
| 5,237,603 | 8/1993 | Yamagata et al. ............... 379/61 |
| 5,276,908 * | 1/1994 | Koohgoli et al. ................ 455/62 |
| 5,353,341 | 10/1994 | Gillis et al. ..................... 379/61 |
| 5,418,839 * | 5/1995 | Knuth et al. ................... 455/341 |
| 5,774,805 * | 6/1998 | Zicker ............................ 455/426 |
| 5,794,141 | 8/1998 | Zicker ............................ 455/418 |
| 5,926,766 | 7/1999 | Yamagata et al. ............... 455/464 |
| 5,963,848 * | 10/1999 | D'Avello ......................... 455/62 |
| 6,052,595 * | 4/2000 | Schellinger et al. ............ 455/450 |
| 6,128,504 * | 10/2000 | Ciccone .......................... 455/464 |

* cited by examiner

Primary Examiner—William Trost
Assistant Examiner—Tilahun B Gesesse
(74) Attorney, Agent, or Firm—Zagorin, O'Brien & Graham, LLP

(57) ABSTRACT

A handset and a base station both periodically scan all channels to determine which channels are clear. The handset clear channel information is transferred to the base station and the base station clear channel information is transferred to the handset. Those channels determined to be clear channels by both the base station and handset are determined by logically combining the clear channel information from the handset and base station and generating an array of available channels. A subset of the available channels is determined and used by both the handset and the base station to initiate communications. A starting channel in the subset is randomly chosen based on a security ID exchanged between the handset and the base station. The remaining channels are selected according to how many channels are predetermined to be scanned. The base station and handset then use only those channels in the subset to communicate. That reduces the power used by the handset since it only scans a subset of the available channels and speeds initial link up time between the base station and the handset.

21 Claims, 4 Drawing Sheets

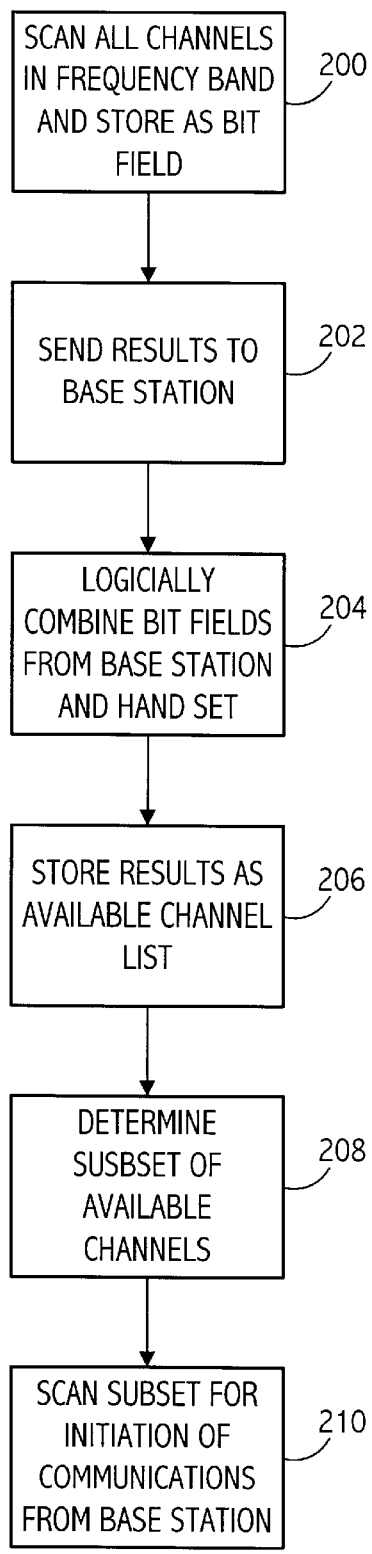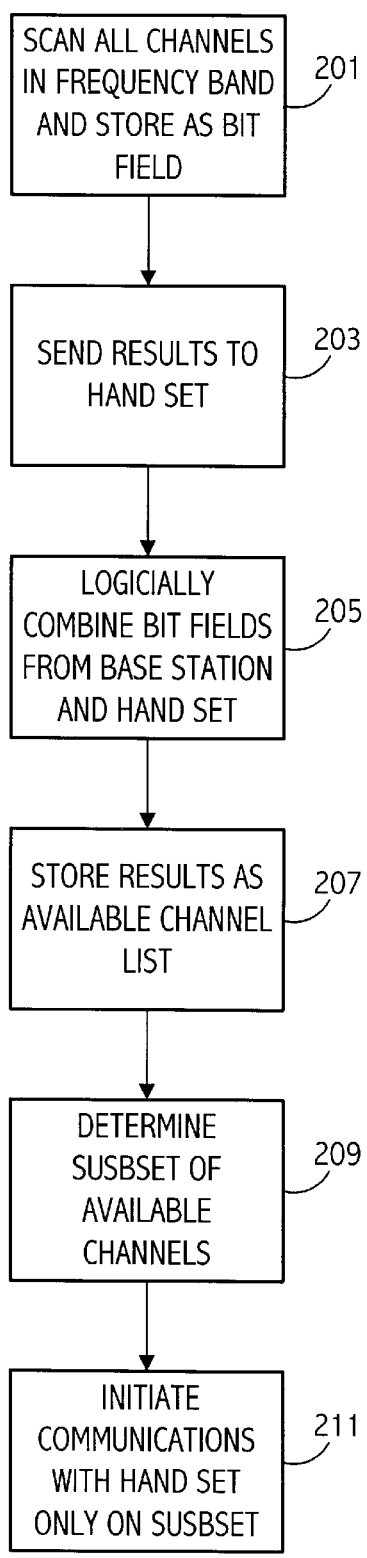
FIG. 2A
FIG. 2B

CHANNEL ARBITRATION BETWEEN HANDSET AND BASE STATION IN A CORDLESS TELEPHONE SYSTEM

BACKGROUND OF THE INVENTION

1. Field of the Invention

This invention relates to cordless telephones and more particularly to channel selection in cordless telephone systems.

2. Description of the Related Art

Cordless telephones include a wall powered base station and a cordless battery powered handset which communicate with each other over a predetermined frequency band through the use of radio transmissions. The frequency band is broken up into a number of channels that may be used by the handset and base station. The handset and base station may both be sharing the same channel (time division duplex) or transmitting on one channel and receiving on another (frequency division duplex). There may be, e.g., forty channels over which communication takes place between the base station and the handset. Having more than one channel increases the likelihood of finding a clear channel on which to communicate.

There can be multiple handsets and base station pairs in relatively close proximity to each other. It is necessary to prevent the multiple handsets and base stations from erroneously or illegally communicating with one another. Therefore, the handset and base station exchange unique security IDs so that they communicate only with the correct partner. The higher the number of bits in the security ID, the less likely the chances of a handset or base station being able to communicate with the incorrect unit. The unique pair of security IDs is created using a random number generator, which is typically implemented in software in both the handset and the base station. When the handset and the base station register with one another, e.g., when the handset is mated in the cradle of base station 101, they exchange security IDs and henceforth use these IDs to establish communications with each other. The random security IDs are stored in nonvolatile memory, so neither a power outage nor an electrostatic discharge event destroys them.

In a standby mode of operation in which most of the power of the handset is off, the handset periodically wakes-up to scan all the channels in the appropriate frequency band to see if there is an incoming call. In the U.S., telephones ring in a pattern of two seconds on and four seconds off. That means that the handset should scan all forty channels at least every two seconds to ensure that the handset does not miss the ring indication being transmitted from the base station over one of the channels. Scanning for incoming calls requires the handset to be actively powered on.

Thus, scanning all forty channels at least every two seconds costs power, which reduces the battery life of the handset, an obviously undesirable result.

In a time division duplex system, where the handset and base station transmit and receive on the same channel, the handset and base station may not always agree on which channels are free and which are not acceptable for communication because of interference. That is especially true if they are located a significant distance from one another, as interference levels may vary in different locations. In a frequency division duplex system, the handset and base station are not capable of measuring whether their counterpart's receive channel has interference or not. To speed initial linkup time between the handset and base station, it would be desirable for both the handset and the base station to know which channels are clear in both the transmit and receive direction. It would also be desirable to achieve longer battery life while still having the advantage of multiple channels.

SUMMARY OF THE INVENTION

Accordingly, a handset and a base station of a cordless telephone system both periodically scan all channels to determine which channels are clear. The handset clear channel information is transferred to the base station and the base station clear channel information is transferred to the handset. The clear channel information from the base station and handset are logically combined to generate an array or list of available channels. The array of available channels indicates those channels which both the handset and the base station consider clear. A subset of the available channels is then selected. A channel in the array of available channels is randomly chosen as a first channel in the subset based on a security ID exchanged between the handset and the base station. The remaining channels in the subset are selected according to how many channels are predetermined to be scanned by the handset for incoming calls. The base station and handset then use only those channels in the subset to communicate. That reduces the power used by the handset since the handset only scans a subset of the available channels in standby mode. In addition, initial link up time between the base station and the handset is improved since only clear channels are scanned for incoming calls.

In one embodiment of the invention, a cordless telephone system according to the present invention includes a base station including a first control processor and associated first memory, first RF transceiver transmitting and receiving over a plurality of channels in a frequency band and a line interface, the base station responsive to an incoming call from the line interface to send an indication of the incoming call over one of a subset of the channels via the RF transceiver. The telephone system also includes a handset having a second RF transceiver and a second control processor and associated second memory. The handset is responsive to a wake-up signal to periodically scan the subset of the channels for the indication of the incoming call. At least one of the handset and base station include a stored array of available channels determined to be clear by both the handset and the base station, the subset of channels over which communications are initiated being a subset of the available channels.

In another embodiment, a method of communicating is provided for a cordless telephone system that includes a base station and a handset, which communicate over a frequency band having a plurality of channels. The handset scans the channels to determine which of the channels, according to the handset, are clear and which channels have radio activity on them. The handset provides the base station an indication of which channels the handset determined to be clear. The base station also scans the channels to determine which of the channels, according to the base station, are clear and which channels have radio activity on them. The base station provides the handset with an indication of which channels the base station determines to be clear. Both the base station and the handset determine the available channels to be those channels determined to be clear by both the base station and the handset. A subset of the available channels is selected on which to initiate calls.

BRIEF DESCRIPTION OF THE DRAWINGS

The present invention may be better understood, and its numerous objects, features, and advantages made apparent to those skilled in the art by referencing the accompanying drawings.

FIGS. 2A and 2B show a flowchart of the operation of the handset and the base station.

DESCRIPTION OF THE PREFERRED EMBODIMENT(S)

Figure 1:
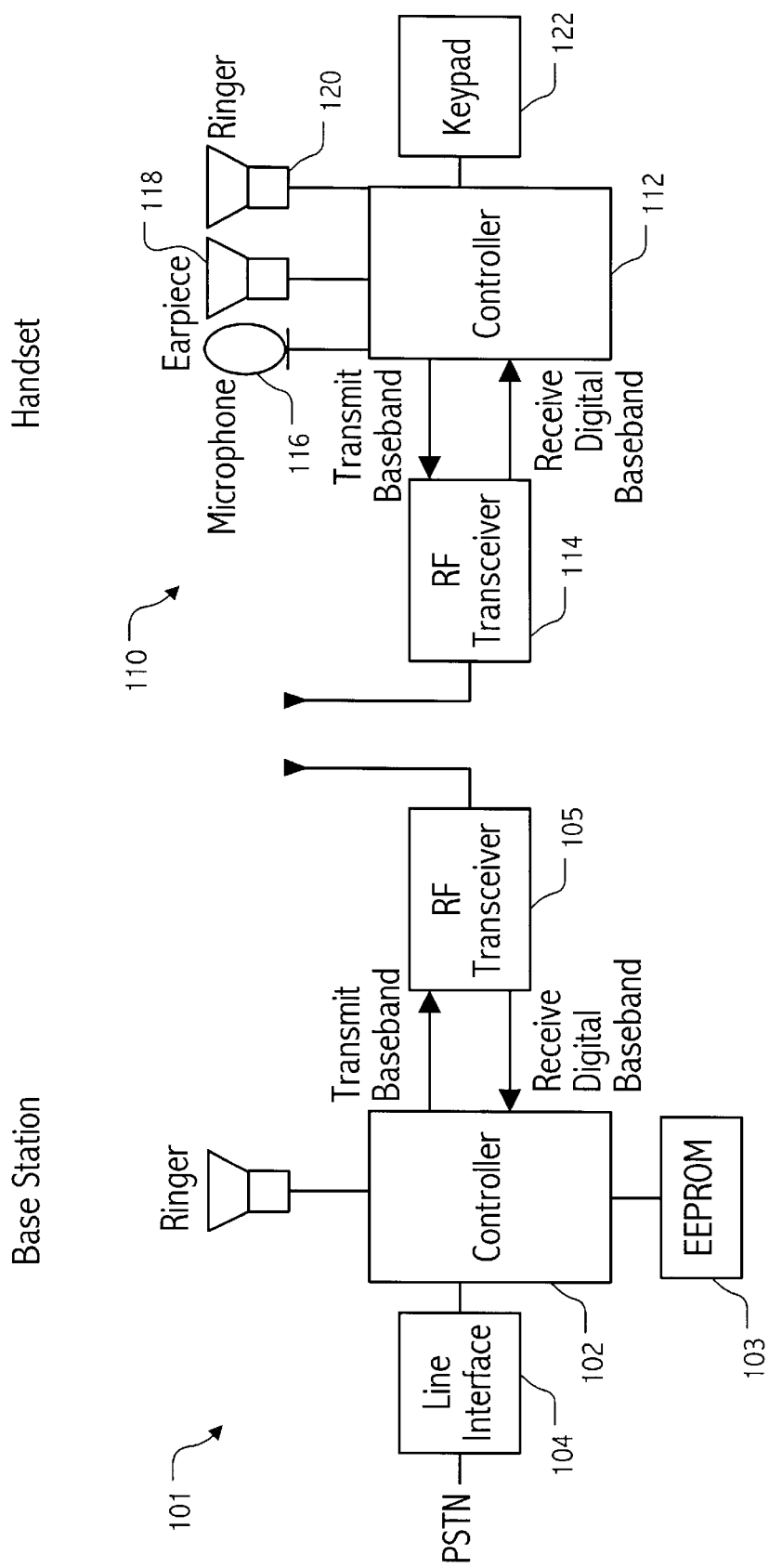
FIG. 1 is block diagram of a telephone system including a base station and a handset.

Referring to FIG. 1, a block diagram illustrates a digital wireless telephone system which includes a wall powered base station 101 and a battery powered handset 110. The base station and handset communicate with each other over a predetermined frequency band through the use of digital radio transmissions. The frequency band is divided into a number of channels that may be used by the handset and base station to communicate with each other. The base station 101 includes controller 102 that provides audio processing, protocol control, data formatting and peripheral functions such as a keypad scanner and a variety of interfaces. The controller includes a microcontroller and memory. In the illustrated embodiment, the base station also includes EEPROM memory 103. The base station further includes a line interface 104 to interface to a public switched telephone network (PSTN) and RF transceiver 105 to communicate via RF transmissions with handset 110.

Handset 110 includes controller 112 that includes a processor and associated memory (not shown). The handset also includes RF transceiver 114 to communicate with the base station and other handset equipment such as microphone 116, earpiece 118, ringer 120 and keypad. The various blocks shown in FIG. 1 are known in the art and are not described further herein except where necessary for understanding the present invention. For example, both control circuits 102 and 112 may be implemented using the AMD Am79C432 ISM PHoXT™ Controller integrated circuit which is described in the "AMD Am79C432 ISM PHOX™ Controller for Digital Cordless Phones Technical Manual", 1996, which is incorporated herein by reference.

The handset and base station may both be sharing the same channel (time division duplex) or transmitting on one channel and receiving on another (frequency division duplex). The handset and base station both determine which channels are mutually acceptable for digital radio transmissions which are then combined into a list of channels acceptable to both the base station and the handset. This subset or list of available channels is further reduced through a random selection process to allow the communication of multiple handset and base station pairs to be spread across the range of available channels. Reducing the number of channels scanned by the handset extends the battery life of the handset because less power on time is required to scan fewer channels.

Figures 3, 4:
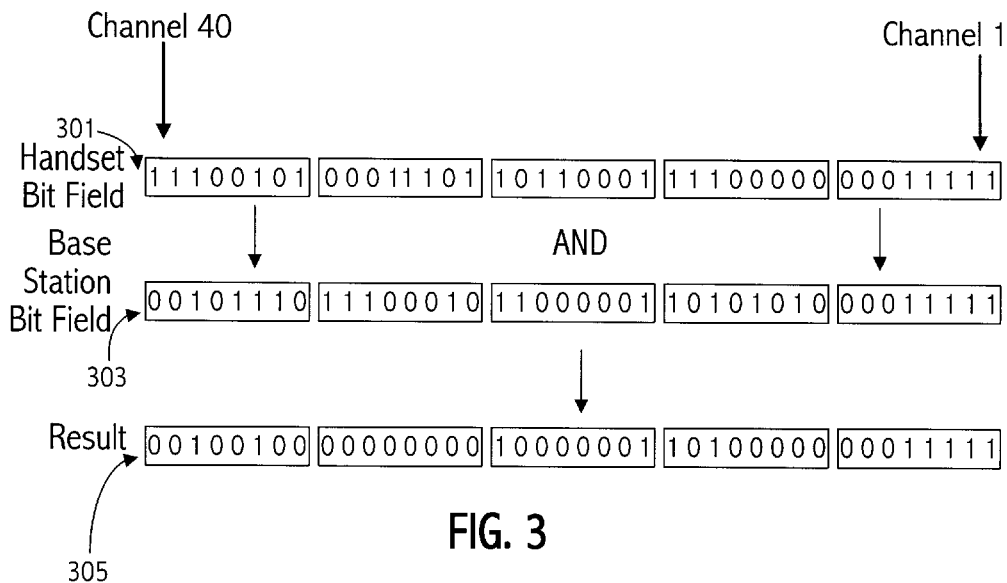
FIG. 3 illustrates the bit field operations for a forty-channel system.
FIG. 4 shows an array of available channels resulting from the bit field operations of FIG. 3.

Referring to FIGS. 2A and 2B a method of operation is illustrated in which the telephone system determines which channels are free of interference, determines a subset of those channels, and communicates over that subset. The handset in step 200 periodically scans all channels (e.g. all forty) to determine which channels are clear and which channels have radio activity (interference). Referring to FIG. 3, that information may be stored in the form of a bit field as shown at 301. Bit 1 of the field corresponds to channel one, bit 2 to channel two, and so on up to the highest number. Each bit that is set (binary one) in FIG. 3 corresponds to a channel that the handset detected to be clear. Each bit that is reset (zero) indicates a channel that is unsuitable for communication. Referring again to FIGS. 2A and 2B, the handset sends the bit field information to the base station in step 202. At step 201, the base station also periodically scans the channels to determine those channels which are clear and those which are unavailable due to interference. At step 203, the base station sends its clear channel information to the handset in the form of a base station bit field 303 as shown in FIG. 3. The two bit fields are logically ANDed in both the handset (step 204) and the base station (step 205) to produce another bit field indicating those channels that are considered to be clear by both the handset and the base station.

FIG. 3 depicts the bit field operation for a forty-channel system. ANDing handset bit field 301 and base station bit field 303 results in bit field 305 having eleven channels that appear clear to both the handset and the base station: channels 1, 2, 3, 4, 5, 14, 16, 17, 24, 35, and 38. FIG. 4 shows the same available channels stored in an available channel array. The available channels are stored consecutively with a unique value, such as "FF" indicating that no more free channels are available.

All eleven channels resulting from the operation shown in FIG. 3 are available for communication. Thus, the base station could choose any of the available channels to initiate communications with the handset. However, the number of clear channels is usually far more than is necessary. Thus, a subset is chosen so that the handset scans only a predetermined number of channels for incoming calls. The number of channels in the subset depends on the power budget available to the handset. That gives the manufacturer a great deal of control over how much power the handset consumes in the standby state since power use correlates to the number of channels scanned in the standby state.

Referring again to FIG. 2A, in step 208 the handset determines a subset of the available channels as described further herein. In step 210, the handset scans only that subset for communications from the base station. The base station also determines the same subset in step 209 and initiates communications with the handset only on the subset in step 211.

Figure 5:
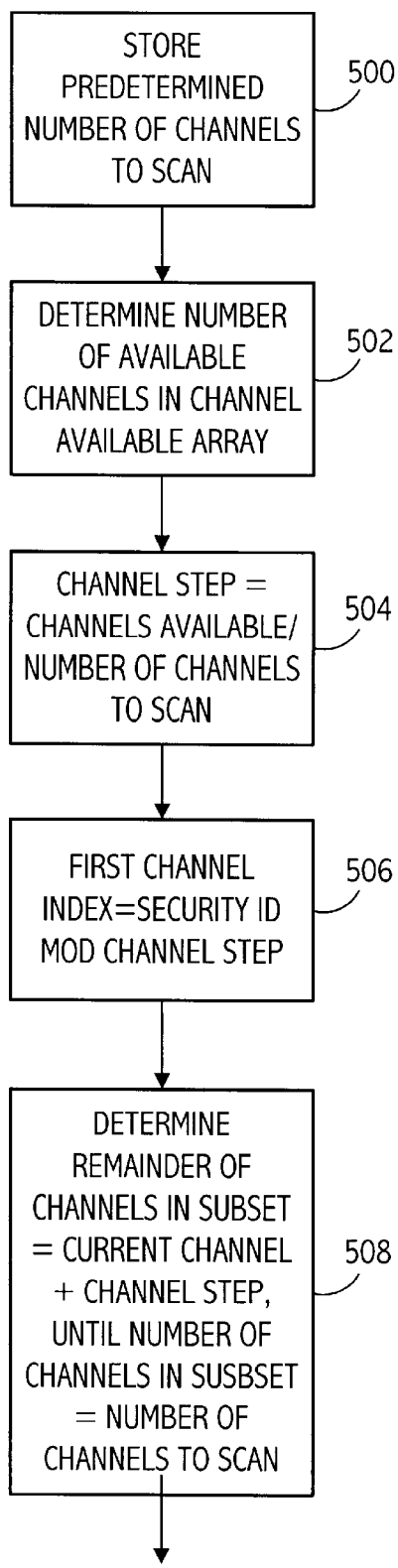
FIG. 5 illustrates a method in which the telephone system of the present invention determines the appropriate subset of the available channels on which to initiate communications.

FIG. 5 illustrates a method in which the telephone system determines the appropriate subset of the available channels on which to initiate communications. The telephone system includes a number (NUM_SCAN) which indicates the number of channels the handset should scan for incoming calls. The manufacturer typically chooses that number, but it could be programmable. The NUM_SCAN number is stored in step 500. Typically, the number is a constant. Thus, for example, the manufacturer might select three as the number of clear channels to be scanned. The total number of available channels is then determined in step 502. That means determining the total number of free channels available (CHAN_AVAIL) in the available channel array (before "FF" entries) shown in FIG. 4. The total number of channels is then divided by the number of channels to be scanned (NUM_SCAN) to generate a channel step number (CHAN_STEP) in 504. The channel step functions as an increment between selected channels in the available channel array.

In order to reduce the risk that like models from the same manufacturer choose the same channels on which to communicate, it is desirable to randomize which of the available channels are selected. The security ID that was generated during registration can be used to achieve that randomization. In step 506, a MOD function on the security ID using the channel step (CHAN_STEP) value determines an index which points to the first channel in the array of available channels. The MOD function divides the security ID by the channel step and uses the remainder from that division operation as the index into the available channel array to select the first channel in the subset. Note that the security ID may be too long to easily divide on a microcontroller. Accordingly, only a portion of the security ID, e.g., the least significant 8 bits, is typically used for this purpose.

Using the example shown in FIGS. 3 and 4, the number of channels available (CHAN_AVAIL) is eleven. The number of channels to scan (NUM_SCAN) has been selected to be three. The channel step (CHAN_STEP) then is determined to be three:

$$CHAN\_STEP = CHANS\_AVAIL/NUM\_SCAN = 11/3 = 3$$

Note that any remainder is ignored. The first channel is then determined using:

$$(\text{security ID}) \ MOD \ (CHAN\_STEP)$$

Again note that the security ID used is typically only one byte of a longer security ID.

The MOD function (remainder of security ID/CHAN_STEP) returns a value for the index of the first channel which will be either 0, 1, or 2 in the illustrated example (since CHAN_STEP is 3). The remaining channels (step 508) are determined by adding the CHAN_STEP to the index of the first channel until the number of channels in the subset equals the number of channels to be scanned. Table 1 illustrates the indices used and the channels selected when the MOD function returns a 0, 1 or 2. The indices are those used with the available channel array shown in FIG. 4. A MOD function returning 0 selects indices, 0, 3, and 6 which corresponds to channels 1, 4 and 16. A MOD function returning 1 selects indices, 1, 4, and 7 which corresponds to channels 2, 5 and 17. A MOD function returning 2 selects indices, 2, 5, and 8 which corresponds to channels 3, 14 and 24.

TABLE 1

| MOD Function Result | Indices | Channels |
| --- | --- | --- |
| 0 | 0, 3, 6 | 1, 4, 16 |
| 1 | 1, 4, 7 | 2, 5, 17 |
| 2 | 2, 5, 8 | 3, 14, 24 |

Both the base station and the handset use the channels chosen for the subset of available channels to initiate calls. The handset scans only those channels determined to be in the subset of available channels. The base station may always scan all the channels since its power budget is not limited. Because of the randomization of the subset of available channels, even if telephone systems from the same manufacturer are within range of each other and select the same channels as being clear, the randomization has reduced the chances of the telephone systems choosing the same subset of available channels in the example to one in three. If the manufacturer chooses fewer channels to be scanned, the channel step generally ends up being larger depending of course on the number of clear channels. A larger channel step in general decreases the likelihood of adjacent phones interfering with each other because the number of possible first channels generally increases with the size of the channel step. In addition, a larger channel step generally reduces the amount of power consumed.

In a typical implementation in both time division duplex (TDD) and frequency division duplex (FDD) modes, the handset and base station communicate clear channel information each time the handset goes into the cradle in the base station. At that time the security ID is typically generated as well.

The functionality described herein is suitable to implement using software to program the microcontrollers. The AND function on the bit fields, the division to determine the channel step, the MOD function to determine the starting channel and even the generation of security IDs are all functionality readily implementable in software to execute on the microcontrollers given the teachings herein. It is also well within the skill in the art to implement any portion of the described functionality in hardware or a combination of hardware and software.

Both TDD and FDD modes operate substantially the same. However, in FDD mode, a particular channel is comprised of one transmit channel and one receive channel typically in a fixed relationship. Table 2 below illustrates transmit and receive frequencies for ten exemplary channels in FDD mode operations. As can be seen in Table 2, each channel number has one, and only one transmit frequency and a corresponding receive frequency. The separation between the transmit and receive frequencies is determined by the hardware radio architecture and is 10.7 MHz in the examples shown.

Assume that Table 2 illustrates the transmit and receive frequencies for the handset. Then the base station has transmit and receive frequencies that are the mirror image. For example, if the handset transmits on 906 MHz and receives on 916.7 MHz (channel 1), then the base station transmits on 916.7 MHz and receives on 906 MHz.

TABLE 2

| Channel No. | Transmit Frequency (MHz) | Receive Frequency (MHz) |
| --- | --- | --- |
| 1 | 906.0 | 916.7 |
| 2 | 906.2 | 916.9 |
| 3 | 906.4 | 917.1 |
| 4 | 906.6 | 917.3 |
| 5 | 906.8 | 917.5 |
| 6 | 907.0 | 917.7 |
| 7 | 907.2 | 917.9 |
| 8 | 907.4 | 918.1 |
| 9 | 907.6 | 918.3 |
| 10 | 907.8 | 918.5 |

Thus, operation of FDD systems and TDD systems for generation of the subset of available channels is essentially the same in both FDD and TDD modes. The handset and base station each determine which of its receive channels are clear and which channels are not acceptable for reception. If either the handset or the base station determines that one of the frequencies in any channel is unusable, then the whole channel is unusable. Thus, a bit field can be sent as in TDD mode indicating which channels are clear and which channels are unusable. ANDing together the bit fields provides an array of available channels. The base station and the handset use the same randomization and selection process described above to determine the subset of channels to be used on which to initiate communications.

Note that the base station scans all channels for incoming calls. If the handset happens to initiate communications on another of the channels other than the subset of channels due to, e.g., an error condition, the base station will still pick up the call. Scanning all the channels does not impact the base station since since there are no power limitations as in the handset. Of course, when the base station initiates a call, it uses the subset of channels to ensure that the handset is listening to the channel on which the call is initiated.

The description of the invention set forth herein is illustrative, and is not intended to limit the scope of the invention as set forth in the following claims. Variations and modifications of the embodiments disclosed herein, may be made based on the description set forth herein, within, without departing from the scope and spirit of the invention as set forth in the following claims.

What is claimed is:

1. In a cordless telephone system that includes a base station and a handset which communicate over a frequency band having a plurality of channels, a method comprising:

scanning the channels to determine which of the channels, according to the handset, are clear and which channels have radio activity on them;

providing the base station an indication of which channels the handset determined to be clear;

scanning the channels to determine which of the channels, according to the base station, are clear and which channels have radio activity on them;

providing the handset with an indication of which channels the base station determined to be clear;

determining the available channels to be those channels determined to be clear by both the base station and the handset;

selecting a subset of the available channels on which to initiate calls;

storing the subset of available channels;

determining a channel available number indicating how many channels are in the available channels;

dividing the channel available number by a number of channels to be scanned in order to determine a channel step;

randomly determining a first channel in the available channels as a channel in the subset; and determining an additional channel in the subset according to the first channel and the channel step.

2. The method as recited in claim 1 wherein determining the first channel comprises:

dividing at least a portion of a random security ID, exchanged between the handset and the base station, by the channel step, to generate a remainder;

using the remainder as an index into an array of available channels to point to the first channel.

3. The method as recited in claim 2 further comprising:

determining the additional channel in the subset by adding the channel step to the first channel to point to the additional channel in the array of available channels; and adding the channel step to the first additional channel to point to a second additional channel in the array of available channels.

4. The method as recited in claim 1 wherein the handset periodically scans only the subset of channels for initiation of communications from the base station.

5. The method as recited in claim 1 wherein providing the handset with the indication of clear base station channels comprises:

generating a base station bit field indicating the channels the base station determined to be clear, the base station bit field corresponding in length to the total number of channels available in the frequency band;

indicating a clear channel by placing a first value in a bit in the base station bit field corresponding to a first channel number;

indicating a channel unsuitable for communications by placing a second value in another bit in the base station bit field corresponding to a second channel number; and sending the base station bit field from the base station to the handset.

6. The method as recited in claim 5 further comprising logically combining a handset bit field indicative of clear channels of the handset and the base station bit field, to determine the available channels.

7. The method as recited in claim 1 wherein providing the base station with the indication of clear handset channels comprises:

generating a handset bit field indicating the channels the handset determined to be clear, the handset bit field corresponding in length to the total number of channels available in the frequency band;

indicating a clear channel by placing a first value in a bit in the handset bit field corresponding to a first channel number;

indicating a channel unsuitable for communications by placing a second value in another bit in the handset bit field corresponding to a second channel number; and sending the handset bit field from the handset to the base station.

8. The method as recited in claim 7 further comprising logically combining a base station bit field indicative of clear channels in base station and the handset bit field, to determine the available channels.

9. The method as recited in claim 1 wherein the scanning of the channels by the handset and the base station to determine which of the channels are clear and which channels have radio activity on them is done periodically by the handset and the base station.

10. A cordless telephone system comprising:

a base station including a first control processor and associated first memory, a first RF transceiver transmitting and receiving over a plurality of channels in a frequency band and a line interface, the base station responsive to an incoming call from the line interface to send an indication of the incoming call over one of a subset of the channels from the first RF transceiver; and a handset including a second RF transceiver and a second control processor and associated second memory, the handset being responsive to a wake-up signal to periodically scan the subset of the channels for the indication of the incoming call; and wherein at least one of the handset and base station include a stored array of available channels determined to be clear by both the handset and the base station, the subset of channels over which communications are initiated being a subset of the available channels; and wherein at least one of the handset and the base station determines a channel available number indicating how many channels are in the available channels; and wherein one of the first and second control processors determines a channel step number, the channel step number indicative of how many entries in the array of available channels are between each channel in the subset of channels, according to a scan number indicating a number of channels to scan and the channel available number.

11. The cordless telephone system as recited in claim 10 wherein at least one of the handset and base station are configured to randomly select a first channel in the subset of channels.

12. The cordless telephone system as recited in claim 11 wherein at least one of the handset and the base station are responsive to select the first channel in the subset according to a security identification number exchanged between the handset and the base station.

13. The cordless telephone system as recited in claim 12 wherein executable code is stored in at least one of the first and second memories and operable on at least one of the first and second control processors to determine the channel step number.

14. The cordless telephone system as recited in claim 13 wherein the executable code is operable on at least one of the first and second control processors to determine the first channel in the subset of channels from the list of available channels according to a remainder generated by dividing the security identification number by the channel step number, the remainder being used as an index in the list of available channels.

15. The cordless telephone system as recited in claim 14 wherein the executable code is further operable to generate a first additional channel in the subset by adding the channel step number to the starting channel to point to a first additional channel in the array of available channels; and is operable to determine a second additional channel by adding the channel step to the first additional channel.

16. The cordless telephone system as recited in claim 10 wherein at least one of the base station and the handset further comprise:

software stored in at least one of the first memory and second memories and operable on least one of the first and second control processors respectively, to determine a starting channel of the subset according to a security identification number and to determine a next channel in the subset by adding a channel step to the starting channel.

17. A cordless telephone system including a base station and a handset which communicate over a frequency band having a plurality of channels comprising:

means in the handset and the base station for periodically determining handset free channels and base station free channels, respectively indicating which of the channels are clear channels to the handset and base station;

means for determining as available channels those clear channels that are common to both the handset and base station clear channels;

means for selecting a subset of the available channels;

means in the handset for periodically scanning the subset of the available channels for incoming calls from the base station;

means for determining a channel available number indicating how many channels are in the available channels; and means for dividing the channel available number by a predetermined number, the predetermined number indicating how many channels are to be scanned by the handset for incoming calls, to generate a channel step.

18. The cordless telephone system as recited in claim 17 further comprising:

means for randomly determining an initial channel in the subset according to a security number exchanged between the handset and the base station and the channel step; and means for determining remaining channels in the subset using the channel step.

19. In a cordless telephone system that includes a base station and a handset that communicate over a frequency band having a plurality of channels, a method comprising:

scanning the channels received by the handset to determine which of the channels received by the handset are clear and which channels have radio activity on them;

providing the base station a list of available channels indicating which channels the handset determined to be clear;

selecting a subset of the available channels on which to initiate calls; and initiating calls from the base station to the handset only on those channels in the subset;

determining a channel available number indicating how many channels are in the available channels;

dividing the channel available number by a predetermined number of channels to be scanned in order to determine a channel step;

randomly determining a first channel in the available channels; and determining an additional channel in the subset according to the first channel and the channel step.

20. The method as recited in claim 19 wherein the telephone set operates in frequency division duplex mode of operation wherein each channel includes a transmit frequency and a receive frequency.

21. The method as recited in claim 20 further comprising:

scanning the channels received by the base station to determine which of the channels according to the base station are clear and which channels have radio activity on them; and providing the handset a list of available channels indicating which channels the base station determined to be clear.

* * * * *